United States Patent [19]

Leblond et al.

[11] 3,852,142

[45] Dec. 3, 1974

[54] APPARATUS FOR APPLYING A RUBBER STRIP ONTO A PNEUMATIC TIRE CARCASS

[75] Inventors: Jean Rene Leblond; Jean Armand Biet, both of Compiegne, France

[73] Assignee: Uniroyal, Clairoix, France

[22] Filed: May 22, 1972

[21] Appl. No.: 255,488

[30] Foreign Application Priority Data
June 3, 1971 France .............................. 71.20233

[52] U.S. Cl. ................ 156/395, 156/130, 156/264, 156/396, 156/405, 156/517
[51] Int. Cl. ............................................ B29h 17/20
[58] Field of Search ........ 156/110 R, 126, 128, 129, 156/130, 394, 395, 405, 406, 408, 396, 517

[56] References Cited
UNITED STATES PATENTS

| | | | |
|---|---|---|---|
| 1,270,380 | 6/1918 | Converse | 156/405 |
| 1,938,787 | 12/1933 | Abbott, Jr. | 156/405 |
| 2,918,105 | 12/1959 | Harris | 156/395 |
| 3,547,732 | 12/1970 | Leblond | 156/405 |

*Primary Examiner*—Daniel J. Fritsch
*Attorney, Agent, or Firm*—Jay L. Chaskin, Esq.

[57] ABSTRACT

An apparatus for the automatic supply, guiding, applying and cutting to the desired lengths of an unvulcanized rubber strip. The rubber strip is applied to a tire carcass to improve the adhesion of the subsequently applied tread layer to the carcass. The apparatus includes means for unrolling the strip from a supply spool and centering the strip onto a transfer drum; means for applying the strip onto the transfer drum and cutting the strip to the desired length; and means for axially moving the transfer drum to a position adjacent a tire building drum where the rubber strip is applied to the building drum.

17 Claims, 13 Drawing Figures

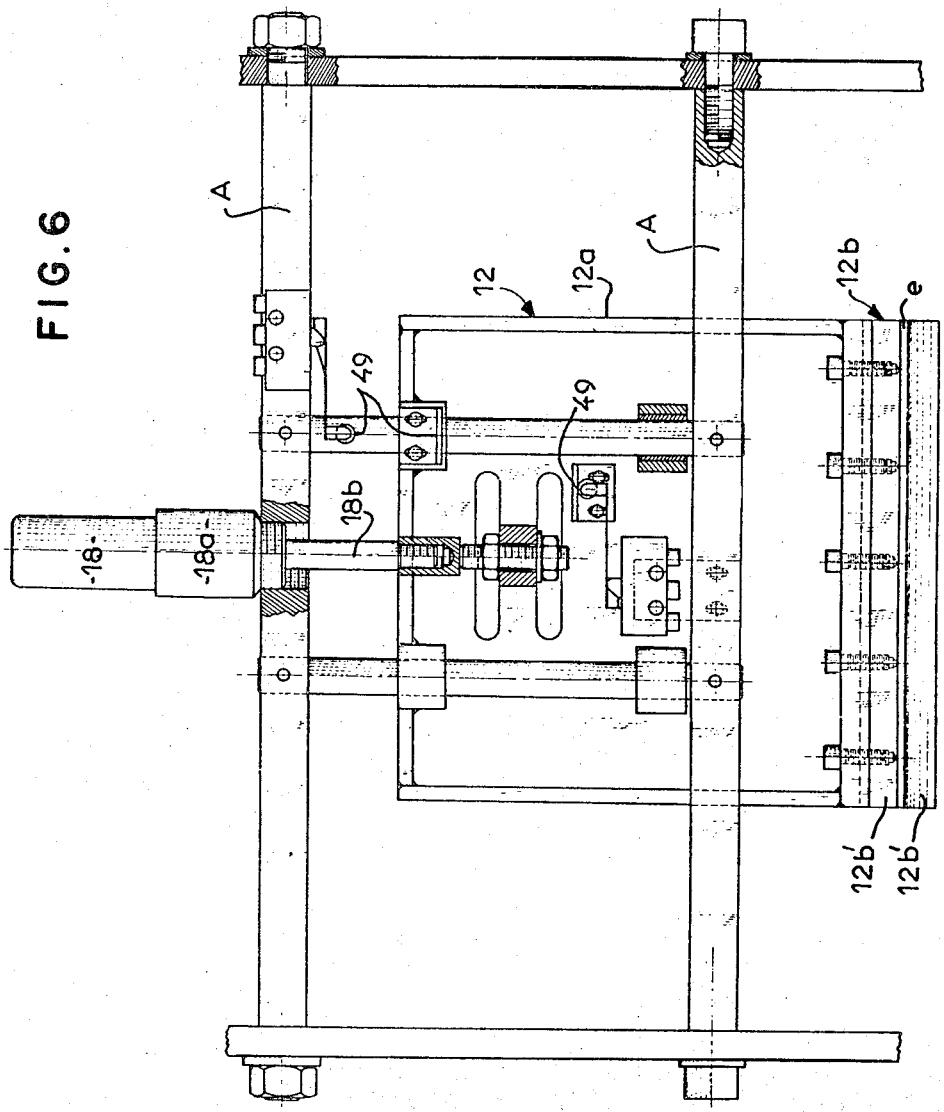

FIG. II

APPARATUS FOR APPLYING A RUBBER STRIP ONTO A PNEUMATIC TIRE CARCASS

This invention relates to an apparatus for the manufacture of pneumatic tires, and, in particular, to an apparatus for applying an unvulcanized strip of rubber onto a tire carcass.

In a manner known a pneumatic tire carcass is constructed from successive layers of rubber coated textile or metal. Before or after shaping into a toroidal form a tread layer is applied, which layer constitutes the final radially outermost layer of the completed tire. In order to increase the strength and performance of the tire, a breaker or belt is disposed between the tread and the carcass. The breaker or belt may also be formed from a rubber-coated layer of a textile or a metal or may be of glass. This invention provides an apparatus for applying a further layer of unvulcanized rubber onto the carcass or onto the breaker layer. This further layer provides an adhesive surface for the subsequently applied tread layer. After vulcanization, the rubber strip is an integral part of the tread.

It is an object of the present invention to provide an improved apparatus for the building of pneumatic tires.

It is a further object of the present invention to provide an apparatus for applying a layer of rubber onto a pneumatic tire carcass.

It is another object of the present invention to provide an apparatus for automatically guiding onto a pneumatic tire carcass a strip of rubber and cutting the strip to a desired length.

It is still another object of the present invention to provide a means for improving the adhesive adherence of a tire tread when such tread is applied to a pneumatic tire carcass.

A further object of the present invention is to provide an apparatus for automatically applying an unvulcanized strip of rubber of a desired width and length over the breaker layer on a pneumatic tire carcass.

The apparatus of the present invention is intended for use in cooperation with a tire building apparatus, which tire building apparatus may be manually or automatically controlled. The operative function of the present invention is to guide and apply, when desired, automatically, the unvulcanized rubber strip onto the carcass which has been previously built on the tire building drum. In particular the apparatus of the present invention includes a plurality of supply spools upon which is wound the strip of unvulcanized rubber interleaved with a strip layer of a plastic, such as polyethylene. From one of the spools a strip is unwound and the end of the strip is axially centered upon a transfer drum. The strip is then wound onto the transfer drum and is cut to the desired length. The desired length is the circumferential peripheral length of the tire carcass upon which the strip of rubber will be finally applied. The transfer drum is axially moved into a position adjacent to the tire building drum. The strip of rubber is then applied to the carcass on the building drum by rolling contact.

The apparatus disclosed herein functions in two transfer positions. In the first transfer position, the unvulcanized strip of rubber is unwound from the supply spool and centered upon the transfer drum; the strip is applied about the circumference of the transfer drum and cut to the desired length. In the second transfer position, the transfer drum is brought into tangential contact with the tire building drum and the strip is applied onto the building drum. The transfer drum is then returned to the first transfer position in order to receive a subsequent strip of rubber. The tire building drum continues in sequence to complete the fabrication of the carcass, e.g., application of bead ring, tread layer, etc.

In accordance with a preferred embodiment of the invention, the axis of the transfer drum is disposed at the end of a pivotable arm. The arm is pivotable between a location which is away from and toward the means for supply, centering and cutting the rubber strip and the tire building drum, respectively. The means for applying, centering and cutting the rubber strip includes a guide means, means for pressing the strip onto the transfer drum and a cutting shoe. The cutting shoe has a notched or grooved side in contact with the strip, which side cooperates with a cutting means for severing the strip at the desired length.

The strip applicator means, the cutting shoe and the pressing means are reciprocally movable along independent axes into and out of the first position of the transfer drum.

The other end of the transfer drum pivoting arm is mounted on a carriage which is parallel to the axis of the drum. The carriage moves in the linear direction to axially shift the transfer drum from the first to the second transfer position.

For a better understanding of the invention, reference is made to the following description, when read together with the accompanying drawings, in which.

Figure 3:
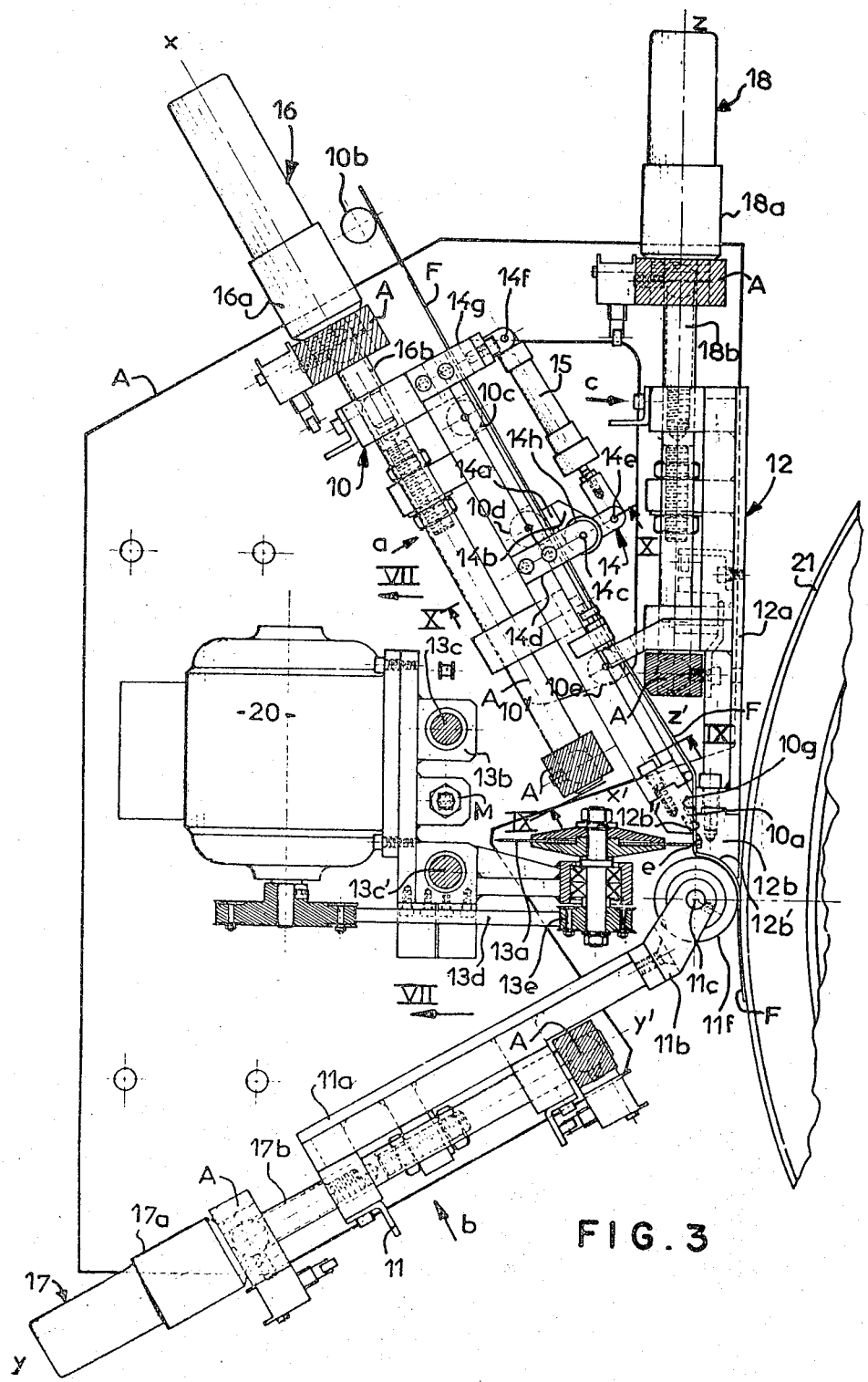
FIG. 3 represents a partial exterior view, in front elevation, on an enlarged scale with respect to FIG. 1, of that part of FIG. 1 that corresponds to the application and cutting means of the apparatus.
Figure 5:
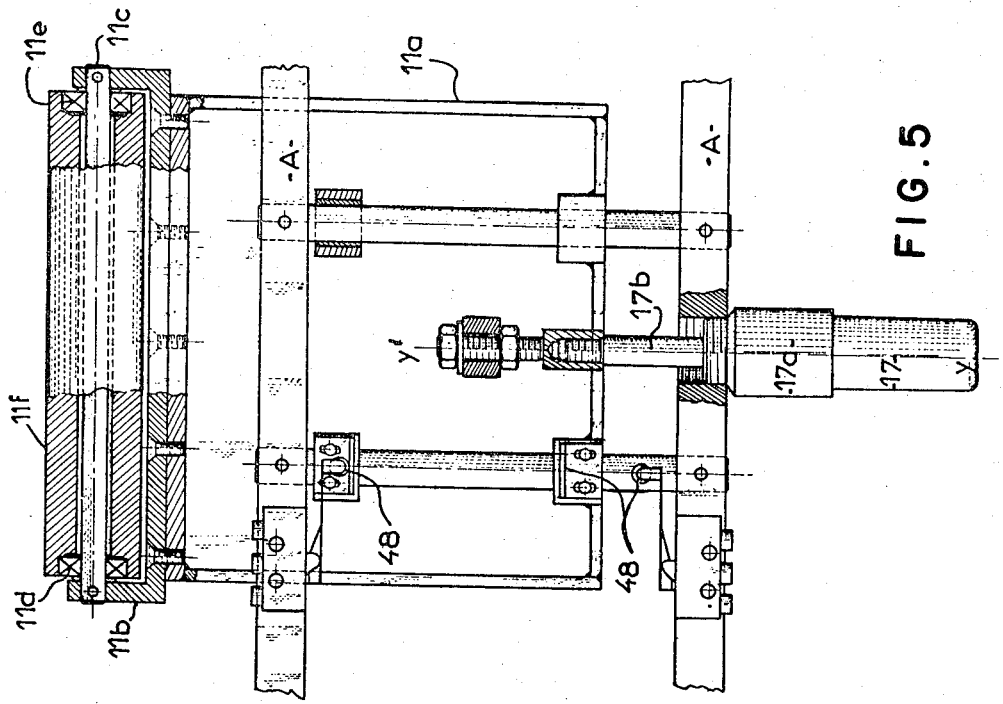
Figure 4:
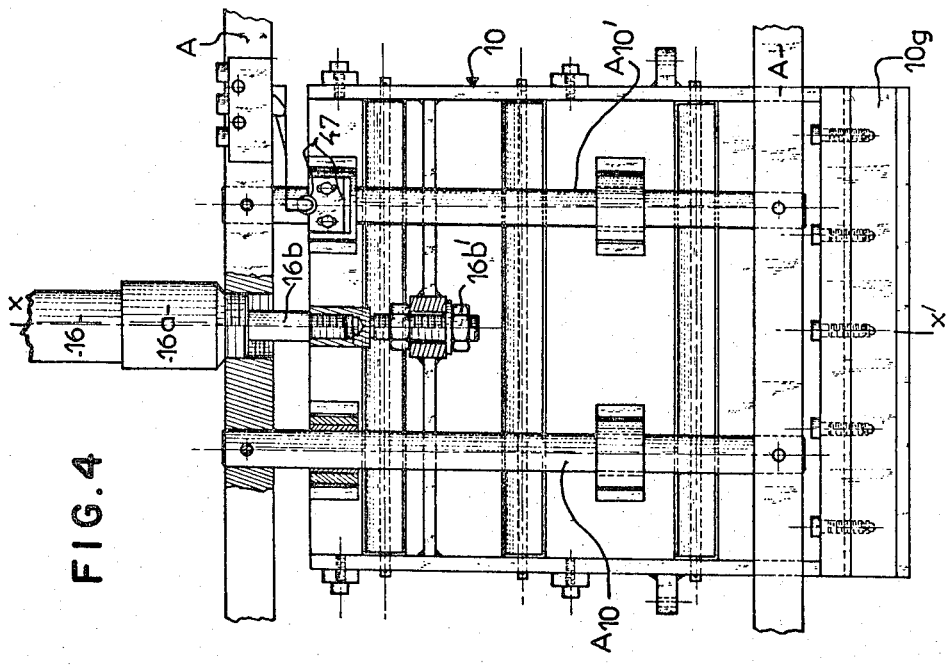
Figure 7:
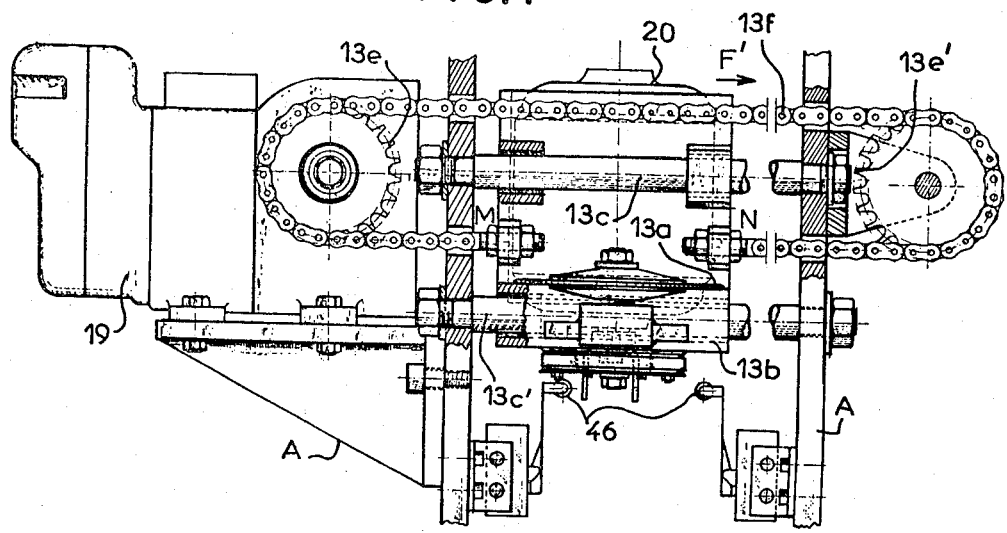
Figure 8:
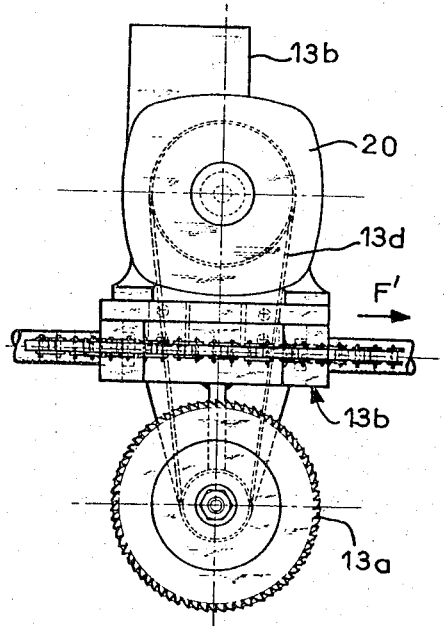
Figure 9:
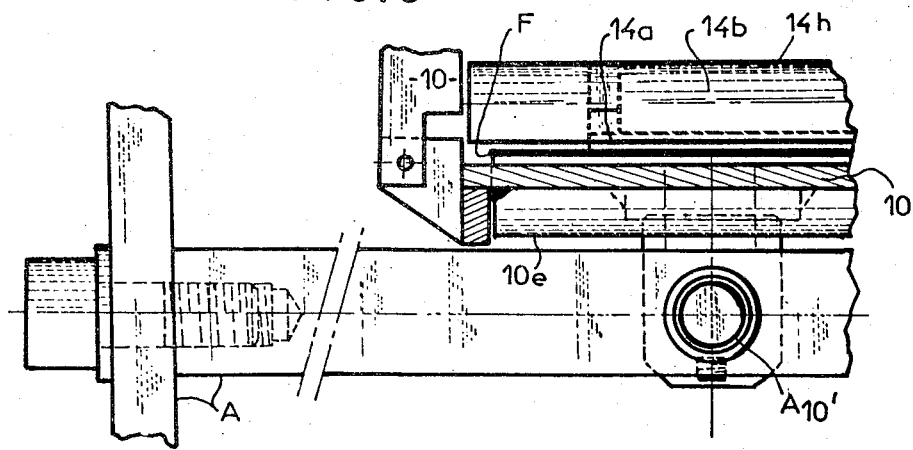
Figure 10:
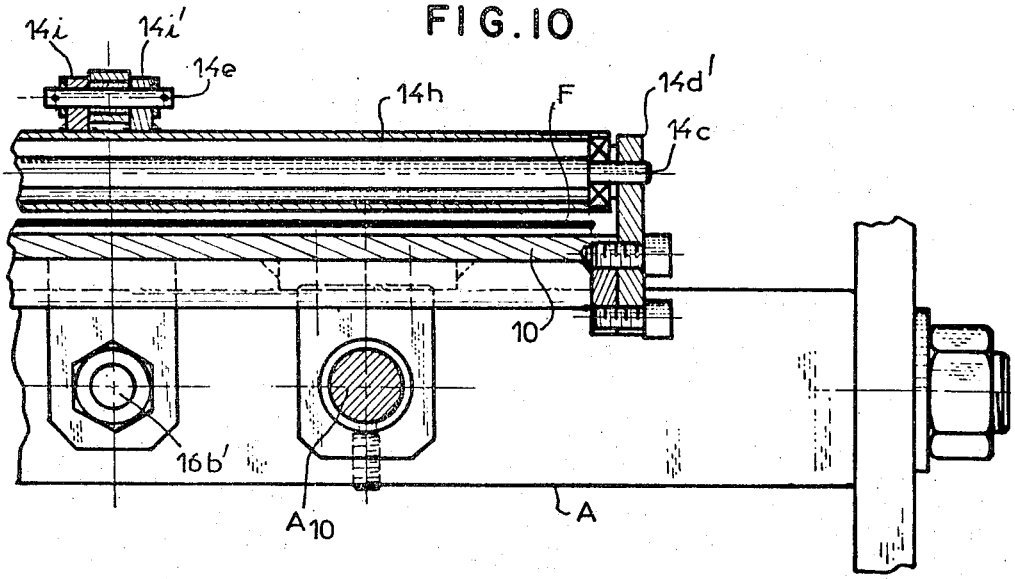
Figure 11:
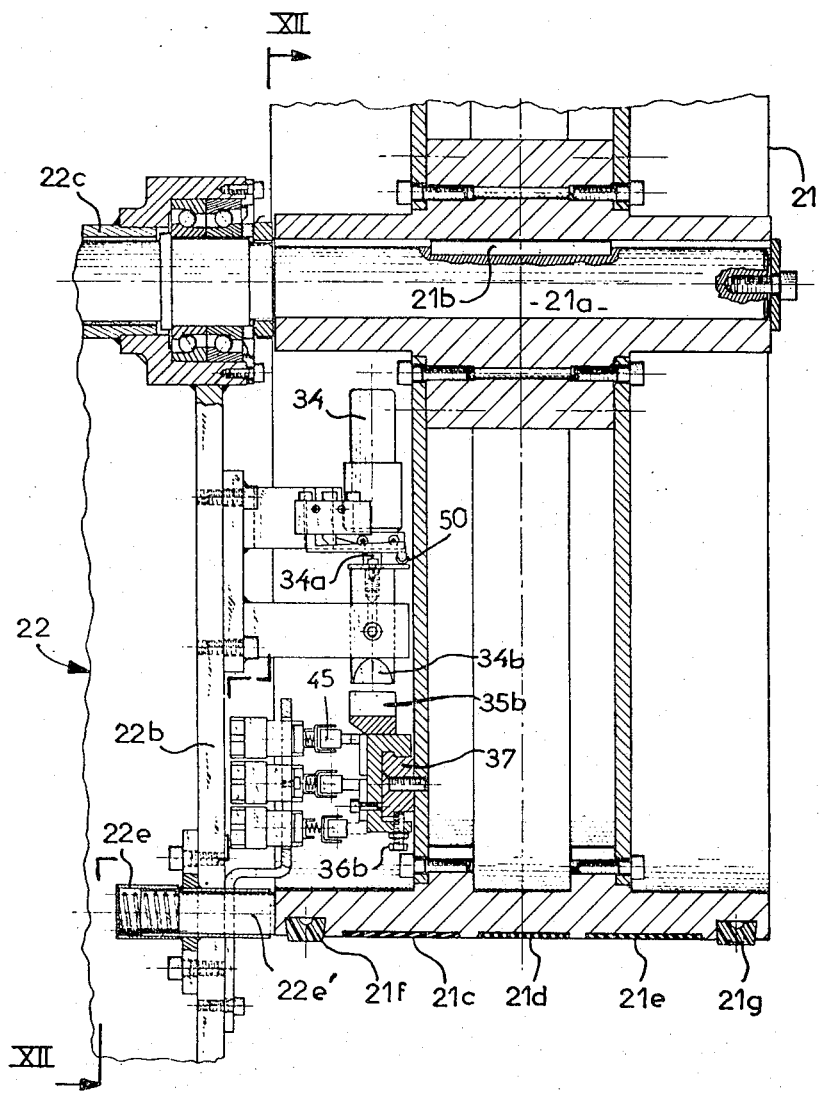
Figure 12:
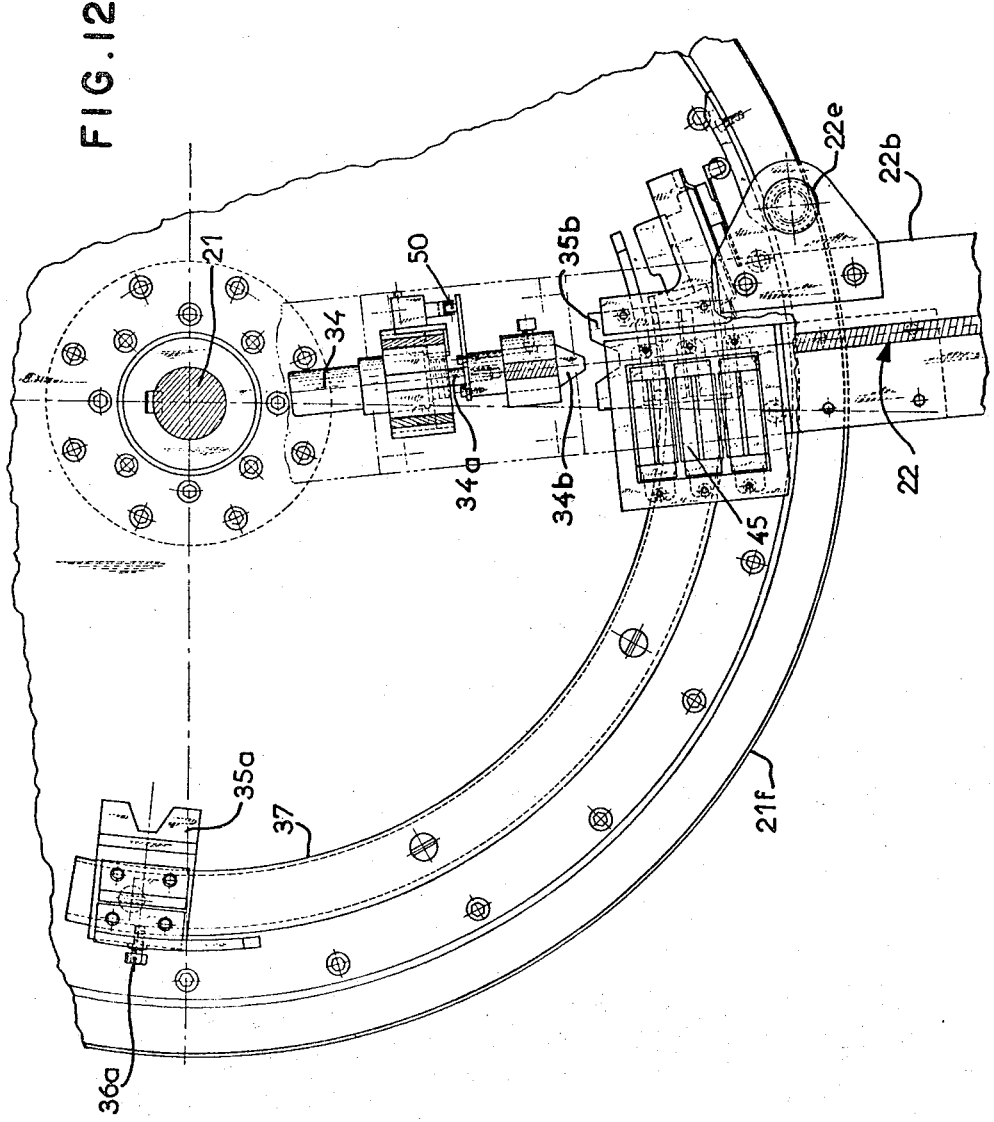
Figure 13:
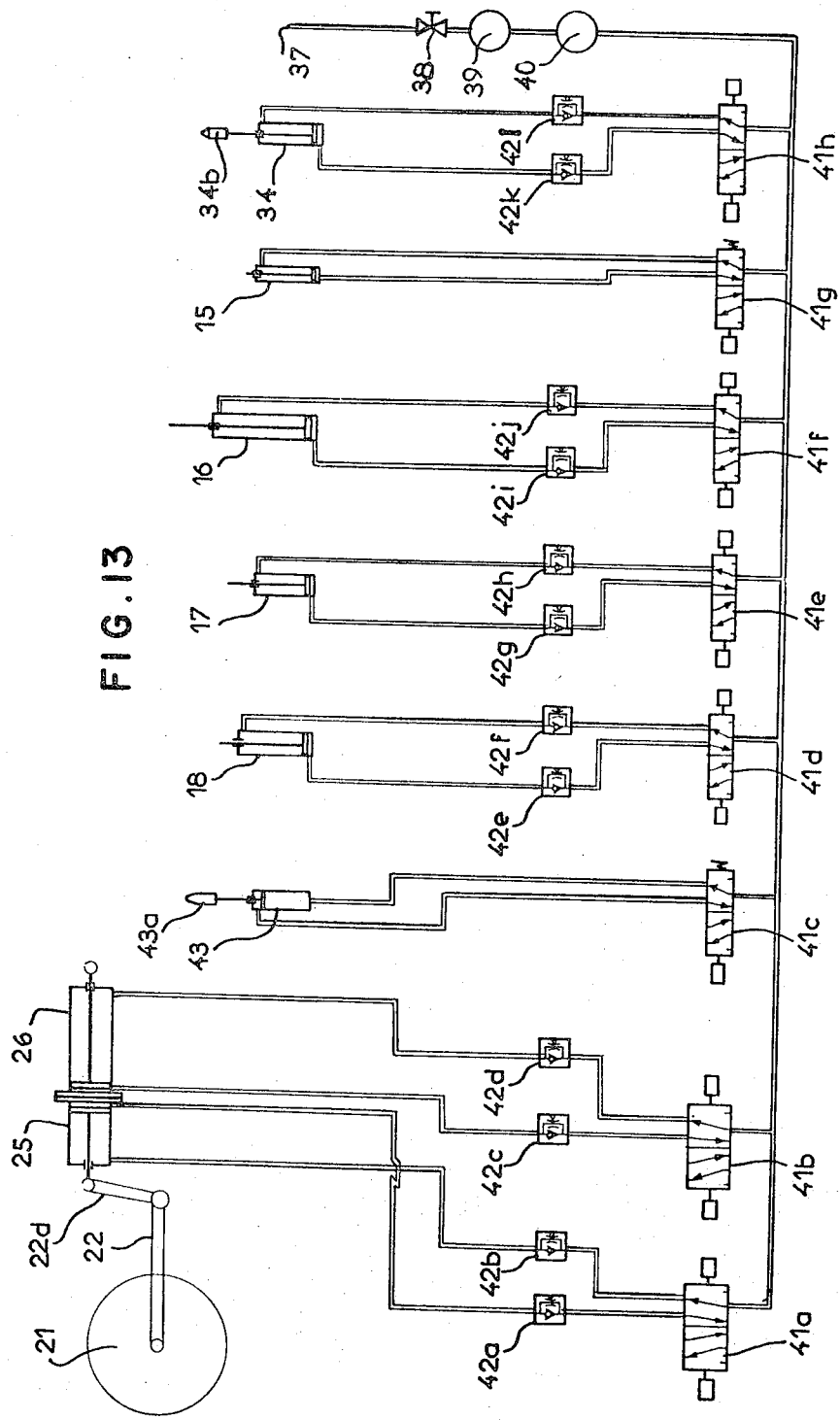

FIGS. 4, 5, and 6 represent partial cross-sectional exterior views, respectively, according to arrows $a$, $b$, and $c$ in FIG. 3, of the applicator, pressing means, and cutting shoe, as well as their means for reciprocal movements;

FIG. 7 represents a partial cross-sectional exterior view, according to VII—VII of FIG. 3, of the cutting means, wherein the other parts of the application and cutting means, as well as the corresponding part of the framework, are assumed to be removed for clarity of illustration;

FIG. 8 represents a top view of the rotary cutter of the cutting means and the means for setting it into rotation, with a 90° rotation of this view with respect to the view illustrated in FIG. 3;

FIG. 9 represents a partial cross-sectional view, according to IX—IX of FIG. 3, of the applicator of the apparatus;

FIG. 10 represents a partial cross-sectional view, according to X—X of FIG. 3, of the same applicator;

FIG. 11 represents a partial cross-sectional view along a diameter of the transfer drum, wherein the cross-sectional plane passes through the pivoting arm connected to said transfer drum;

FIG. 12 represents a partial cross-sectional view of the transfer drum; as viewed perpendicular to one of its opposite sides, which shows the structure of the means for locking the angular position of the transfer drum; and FIG. 13 represents a schematic view of the complete system for controlling the pneumatic jacks used by the apparatus.

Figure 1:
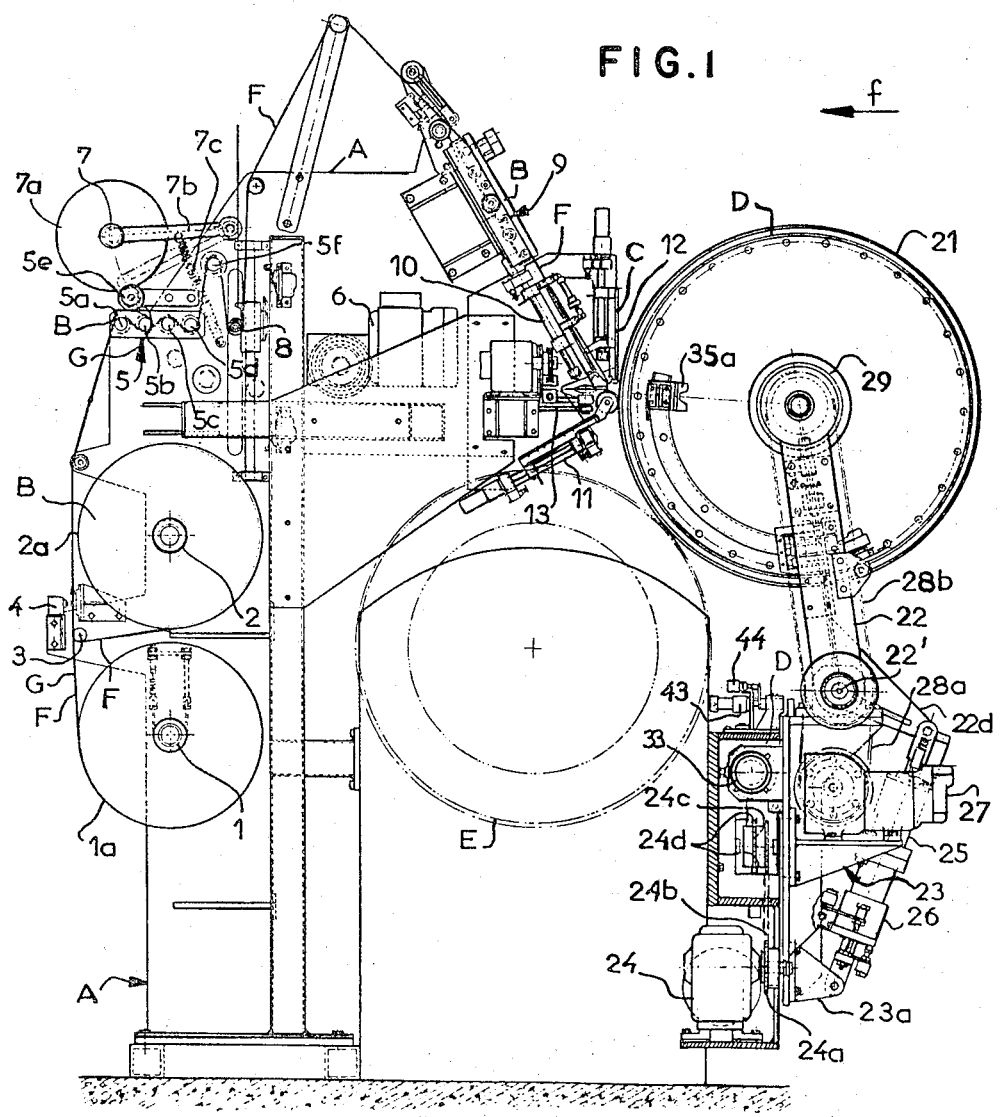
FIG. 1 represents an overall view, in front elevation, of the apparatus according to the preferred embodiment of the invention.
Figure 2:
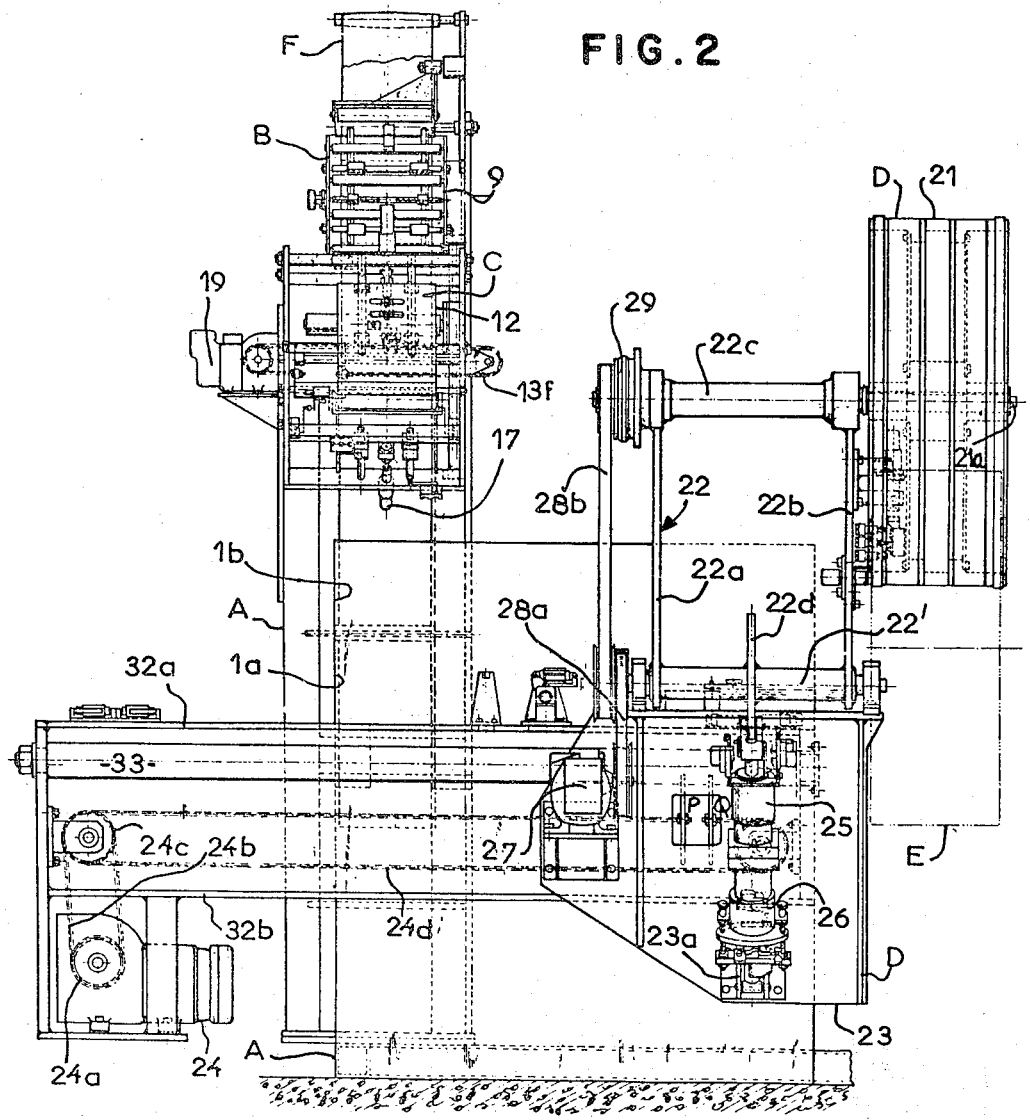
FIG. 2 represents an overall view, in side elevation, according to arrow $f$ in FIG. 1 of the apparatus.

The apparatus represented in FIGS. 1 and 2 includes a framework A on which is mounted a supply and centering means B, an application and cutting means C, and a transfer assembly D, which includes the transfer drum 21, wherein the building drum of the tire building machine is represented by dot-dash lines and is designated as E.

In the position shown in FIGS. 1 and 3, the transfer drum 21 is in the first position which corresponds to the transfer of the rubber strip F from the application and cutting means C to the transfer drum 21. In contrast, in FIG. 2, the transfer drum 21 is shown in the second position which corresponds to transfer of part of the cut strip from the transfer drum 21 to the tire-building cylinder E. Movement from the first transfer position (represented in FIG. 1) to the second transfer position represented in FIG. 2) is accomplished by horizontal movement of the transfer assembly D on guide rails 32a, 32b, and guide rod 33 (FIG. 2), The supply and centering means B include two spindles 1 and 2 upon which are wound a length of the rubber strip F, of the desired width, each layer of the strip being interleaved with a polyethylene strip G.

Two supply spindles are used in order to decrease the need for changing the corresponding spools 1a and 2a as much as possible. A photocell 4 is located in the path of strip F and polyethylene liner G, after a return roller 3, so as to monitor the presence of the strip F. A separating means 5 recovers the liner G as the strip F has unwound. The separating means 5 comprises a series of four rollers 5a, 5b, 5c and 5d, each of which are driven by a motor 6; a roller 5e that receives the polyethylene liner G when separated from the rubber strip at the outlet of roller 5b; and a spindle 7 on which the polyethylene liner is wound, so as to form a reusable spool 7a of polyethylene. Spool 7a is urged against roller 5e by a spring controlled arm 7b that is under tension by spring 7c. The four rollers, 5a, 5b, 5c and 5d, are milled to a smooth finish in order to provide a uniform and linear feed of the strip, i.e., without longitudinal or lateral slipping. Spool 7a is set into rotation by friction, by means that are not represented. A return roller 5f, which is driven in the same way as rollers 5a–5d, sends the strip F to a compensating roller 8. A known reaction-regulation assembly (not shown) controls the starting and stopping of the drive motor 6 for rollers 5a, 5b, 5c and 5 d, and 5f, in order to provide a regular passage of the strip F to the application and cutting means C. The means 9 for centering the rubber strip F comprises an assembly of rollers that are loosely mounted on their respective shafts. These rollers provide the necessary correction to the strip position so as to ensure a symmetrical positioning of the strip on the transfer drum 21 and, subsequently, the tire-building drum E.

The application and cutting means C, (FIG. 3) comprises an applicator 10, which is located immediately downstream from the centering means 9 on the path of the strip F, means for pressing 11 the strip F onto the transfer drum 21, a cutting shoe 12, and cutting means 13 that cooperate with the cutting shoe, to periodically divide the strip F transversally, so as to obtain successive portions of the strip having a predetermined length (FIGS. 1 and 3). The purpose of the application and cutting means is to provide the following four functions; transfer and application of the rubber strip F to the transfer drum 21, cutting of the strip, and returning to the initial condition.

The lower end of the applicator 10 is equipped with several rows of pins such as 10a, and its upper side is provided with several rollers 10b, 10c, 10d, 10e. Roller 10d, cooperates with a pressure element 14a which is attached to one end of a bent element 14b. Element 14b is pivotably attached at 14c to lugs 14d–14d'. Lugs 14d–14d' are rigidly attached to the body of the applicator 10. The other end of the bent element 14b is pivotably mounted at 14c to one end of a bar of a jack 15 that is pivotably mounted at 14f on lugs 14g–14g'. Lugs 14g–14g' are rigidly attached to the body of the applicator 10. Elements 14c and 14b form a pivoting clip 14 that is controlled by jack 15. Applicator 10 is freely mounted to move rectilinearly and alternately under the action of a dual effect jack 16 whose cylinder 16a is attached to the framework A and whose piston 16b is connected to the applicator 10. Piston 16b moves in direction of travel X–X'.

The pressing means 11 comprises a movable arm 11a that terminates in a housing 11b in which a splined shaft 11c is mounted. A pressure roller 11f is loosely mounted on shaft 11c by interposition of bearings 11d and 11e (FIG. 5). Roller 11f applying pressure to the strip F and transfers the strip to the outer surface of the transfer drum 21. The arm 11a moves rectilinearly and alternately, according to direction Y–Y', under the action of a dual-effect jack 17 whose cylinder 17a is attached to the framework A and whose piston 17b is attached to the movable arm 11a.

The cutting shoe 12 comprises a motor-driven carriage 12a having a lower end terminating in a shoe 12b. Shoe 12b has a surface 12b' which conforms to the shape of the pressure roller 11f and a curved surface 12b'', which is turned toward the applicator 10. Curved surface 12b'' has a groove e through which the rotary cutter 13a of the cutting means 13 penetrates. The carriage 12a can move rectilinearly and alternately, in the vertical direction Z–Z', by means of a dual-effect jack 18 whose cylinder 18a is attached to the framework A and whose piston 18b is attached to the motor-driven carriage 12a.

The structure of the cutting means will now be explained in detail with reference to FIGS. 3, 7, and 8 (see also FIG. 1). The cutting means 13 includes rotary cutter 13a that comprises a circular disk having a sawtooth periphery and a motor-driven carriage 13b. Carriage 13b can be moved, over the appropriate slides 13c and 13c', in a direction that is substantially perpendicular to the plane of FIG. 3, which direction is represented by the F' arrows in FIGS. 7 and 8. As noted above, rotary cutter 13a penetrates inside the groove or slot e. Movement of carriage 13b permits the cutter 13a to traverse the slot e thereby cutting the rubber strip F throughout its entire width. Rotary cutter 13a is driven by a motor 20 (FIGS. 3 and 8) which is mounted on the motor-driven carriage 13b, and a toothed belt 13d. The alternating, rectilinearly travel of the carriage 13b is provided by a motor 19 mounted on the framework A (FIG. 7), whereby the motion is transmitted by a chain-and-pinion system that includes pinions 13e and 13e' and open chain 13f whose ends are respectively attached, at M and N to the two opposite sides of carriage 13b.

FIGS. 9 and 10, as well as FIG. 4, show the structure and features of applicator 10. These figures show the framework A; guide rod $A_{10}A_{10}'$, of applicator 10, which are attached to the framework A; the top 16b' of the piston 16b; rubber strip F; roller 10e; roller 14h, which is pivotable around axis 14c of the bent element 14b; and securing lug 14d', which is similar to securing lug 14d described in reference to FIG. 3. Bent element 14b included lugs 14i and 14i' on one of its sides, whereby these lugs are welded to rollers 14h so as to form a housing. The other side of bent element 14b, which is not represented in FIG. 10, terminates at pressure element 14a, which can be seen in FIGS. 3 and 9.

Reference is made to FIGS. 1 and 2, as well as in FIGS. 11 and 12, for the structure of transfer assembly D which carries the transfer drum 21. The transfer assembly D includes a carriage 23 that has a double generally U-shaped arm 22 which is pivotably attached to a shaft parallel to shaft 21a of transfer drum 21. Transfer drum 21 is rotated by shaft 21a by spline 21b (FIG. 11). Carriage 23 of transfer assembly D can be moved along slides 32a and 32b and rod 33 (FIG. 2) by a motor-reduction gear unit 24 that includes an electric brake and a torque limiter. Transmission is accomplished by pinion 24a driving a first chain 24b and by pinion 24c driving a second chain 24d (FIG. 2) whose ends are attached at P and Q to carriage 23. Locking means 43 secures the carriage 23 accurately in each of its two extreme positions, which respectively correspond to transfer of the strip F from the applicator 10 to the transfer drum 21 and transfer of a portion of the strip F from the transfer wheel 21 to the tire-building drum E. An automatic device (not shown) stops the movement of the transfer drum 21 when the carriage 23 is an intermediate position near the tire-building drum, i.e., an intermediate standby position that makes it possible to limit the useful travel toward the tire-building drum to a smaller path during the application operation. The rotational motion of the transfer drum 21 is provided by motor 27, through toothed belts 28a and 28b. An electromagnetic clutch 29 directly drives shaft 21a. Shaft 21a extends into transfer drum 21 through a sleeve 22c, which is an integral part of the double pivoting arm 22. When the clutch 29 is not actuated, the transfer drum 21 and shaft 21a freely rotate. The rotation of drum 21 and shaft 21a occurs during transfer of part of the rubber strip to the tire-building drum. Thus the rotation of drum 21 and shaft 21a also rotates the tire-building drum by frictional contact.

The transfer assembly D pivots double arm 22 the desired value around its pivot axis 22'. This arrangement includes a rod 22d, one end of which is joined to an assembly of two jacks 25 and 26 that are placed back to back. Jack assembly 25, 26 is connected at its opposite end, to a joint on the other end of the rod lugs, such as 23a, which are attached to carriage 23. The strokes of jacks 25 and 26 are different. Jack 25 has a short stroke, so that actuation of this jack alone moves the transfer drum 21 slightly closer to or farther away from the first transfer position (loading of the strip F and the transfer drum 21). Jack 26 has a longer stroke such that when it alone is actuated, transfer drum 21 is moved farther away from or closer to the second transfer position, i.e., from the tire-building drum, in order to deposit part of the strip carried by the transfer drum. The return position of the two jacks corresponds to the position of the transfer drum 21 when it is moving parallel to its own axis, i.e., moving from one transfer position to the other.

FIGS. 11 and 12 show the structure of the peripheral surface of the transfer drum 21 and that of the means for locking the angular position of the transfer drum. As can be particularly seen in FIG. 11, the transfer drum 21 has a layer of one or more strips (three strips 21c, 21d, and 21e in the example represented) of vulcanized natural rubber on its outer surface. The unvulcanized rubber strip F adheres to this layer, whereby rubber or plastic joints 21f, 21g are additionally provided, on both sides of the layer, to limit crushing of the layers and to thereby avoid any distortion during application. Arm element 22b of pivotably arm 22 includes a spring brake 22e having a piston 22e'. Spring brake 22e acts upon the rim of transfer drum 21, with a predetermined gripping force, thereby regulating the rotational speed of the transfer drum 21. FIGS. 11 and 12 also show the means for locking the angular position of the drum 21. The locking means includes a jack 34 carried by arm element 22b. Piston 34a of jack 34 terminates in a male element that forms bolt 34b of the locking means. The female element 35a, 35b of the locking means is arranged according to the angular locking position, on a segment 37 of a circular arc which is integral with the drum 21. The female element 35a or 35b is suitably notched and is attached to the segment 37 by means of screws such as 36a and 36b. It is to be understood that a plurality of such female elements, are located at desired angular positions on segment 37. Under control of jack 34 drum 21 can be locked by locking means 34b, 35a, in any desired angular position.

FIG. 13 shows a schematic of the pneumatic control system of the different pneumatic jacks of the installation. Back-to-back jacks 25 and 26 actuate rod 22d of pivotable arm 22. Jack 43, which is mounted on the framework A (see FIGS. 1 and 2), has a piston-bolt 43a which cooperates with the female elements of corresponding shape on the carriage 23 as to form means for locking the extreme and intermediate positions of alternating travel of the moving assembly D. Jack 18 controls cutting shoe 12. Jack 17 controls pressing means 11. Jack 16 controls applicator 10. Jack 15 controls clip 14, and jack 34 controls bolt 34b for the angular locking of the transfer drum 21. The control air is supplied at 37 under a pressure of eight bars. The pneumatic circuit further includes a check valve 38, a filter 39, and a lubricator 40. Solenoid-like selectors 41a–41h are controlled as a function of readings from various controls on different parts of the device. Permanent leak feed antireturn valves, 42a–42l control the rate of application of the pneumatic pressure. The primary means of control comprise electrical start-stroke and end-stroke contacts, wherein one of the contact elements is carried by the moving component and the other is carried by a component with respect to which the moving component is displaced. The contacts for detecting the movement of the transfer assembly D are designated by reference 44 (FIG. 1). The contacts for detecting the angular position of the transfer drum 21 are inclination rollers 45 (FIGS. 11 and 12). The contacts for detecting the position of the motor-driven carriage 13b associated with the cutting means 13 are designated by reference 46 (FIG. 7). The contacts for detecting the position of the applicator 10 are designated by reference 47 (FIG. 4). The contacts for detecting the position of the arm 11a associated with the pressing means 11 are designated by reference 48 (FIG. 5). The contacts for detecting the position of the motor-driven carriage 12a of the cutting shoe 12 are designated by reference 49 (FIG. 6.). The contacts for detecting the actuation of locking jack 34 is designated by reference 50 (FIGS. 11 and 12).

The operation of the apparatus includes two transfer phases: (1) a loading or "first transfer" in which the rubber strip F is applied to the transfer drum 21 and cut to the desired length and (2) an application or "second transfer" in which the transfer drum 21 is guided adjacent the tire-building drum E and the rubber strip F is transferred by frictional contact to drum E.

In the loading phase, the transfer drum 21 is guided to the first transfer position such as to be adjacent the application and cutting means C, and is locked by means of jack 43 in this position. The actuation of short-stroke jack 25 pivots arm 22 to initiate the first transfer position represented in FIGS. 1 and 3. Applicator 10, pressing means 11 and cutting shoe 12 are then withdrawn from the transfer zone by jacks 16, 17 and 18 respectively. Rotary cutter 13a and carriage 13b that carries the cutter are then moved to one side. Rubber strip F is at the end of the preceding cycle and is therefore maintained by pins 10a and the lower part 10g of the applicator 10. In addition, strip F is also secured to applicator 10 by clip 14.

After the transfer drum 21 has been locked against rotation by the actuation of jack 34, applicator 10 is then advanced toward the transfer drum by jack 16. The end of the rubber strip F that is hooked on pins 10a then comes in contact with the transfer drum 21 on the rubber layers 21c-21d-21e to which it adheres. Clip 14 is then released by jack 15 and the applicator is withdrawn by jack 16. The end of the strip F remains attached to the transfer drum 21, since the strip is unhooked from the pins 10a and because of the favorable orientation of the pins 10a when the applicator is withdrawn.

The pressing means 11, which includes pressure roller 11f, is then advanced by actuating jack 17, whereupon the roller bears on the rubber strip at the same place where the strip has just been applied to the transfer drum 21. Actuation of jack 34 releases the locking means and drum 21 is then turned a predetermined angle, which angle is function of the length of the cut-off strip. The desired length of the strip corresponds to the characteristics of the carcass of the pneumatic tire to be manufactured, and specifically to the length of the peripheral circumference of the carcass. During rotation, the rubber strip F is applied to the layers 21c-21d-21e by the roller 11f which presses against the transfer drum. The rotation of drum 21 is then stopped and the drum is then locked again into a given angular position, by actuation of jack 34. Carriage 12a of cutting shoe 12 is then advanced by jack 18 and shoe 12b forces the rubber strip F to follow curved path represented in FIG. 3. The applicator 10 is advanced by actuation of jack 16 so that the pins 10a are pressed into the strip F. Strip F is then secured to the applicator 10 by actuating jack 15 which controls clip 14. The present operative position of the application and cutting unit C is indicated in FIG. 3. Carriage 13b of cutting unit 13 is then moved by motor 19 in direction perpendicular to the plane of FIG. 3, and cuts strip F in the area of the groove or notch e.

The applicator 10 is then withdrawn by jack 16 after which the cutting shoe 12 is withdrawn by jack 18. The angular locking means 34 releases transfer drum 21. Drum 21 is then rotated again by motor 27 so that the terminal part of the cut-off portion of the rubber strip F can be applied to the layers 21c-21d-21e. The drum 21 is then angularly positioned to adjust the location of the terminal part of the strip so as to be at the zone of tangency with the tire-building drum E in preparation for the application phase or second transfer position.

The pressing means 11 is then withdrawn by jack 17 and the application and cutting means C is now in its initial position, where it is ready for a new loading phase.

The transfer drum 21 is guided to an intermediate standby position. This is accomplished by actuating short-stroke jack 25 which pivots arm 22 after having unlocked the carriage 23 with respect to the framework on which it slides, by the action of jack 43. The transfer drum 21 is then guided slowly to the vicinity of the second transfer position. In this position, the carriage 23 is again locked with respect to the frame by jack 43. Long stroke jack 26 is then actuated, pivoting arm 22 so as to bring drum 21 into tangential contact with the tire-building drum E. The rubber strip F cararied by the transfer drum 21 is applied to the tire-building drum E as represented in FIG. 2, by simple adherence of the strip to the rubber that has been previously applied to the tire-building drum, as drum 21 and E rotate.

After completing the application phase, the transfer drum 21 is guided to the first transfer position, by reversing the direction of the carriage 23, so as to be in position for another loading phase.

It is understood that the present invention is not limited to the embodiment described and represented. In particular, it includes all means that constitute technical equivalence of the means described, as well as their combination, if the latter are described according to the concept of the invention.

What is claimed is:

1. An apparatus for applying a rubber strip of a desired length to a pneumatic tire carcass mounted on a tire building drum, said apparatus comprising means for supplying said strip to an application means; application means for receiving said strip and for winding said strip on a transfer drum located at a first position adjacent said application means, said transfer drum having an outer surface to which said strip adheres, said application means including means for pressing said strip onto the transfer drum; means for cutting said strip to a desired length corresponding to the circumferential length of the carcass on the tire building drum after winding said strip on the transfer drum;

means for axially moving the transfer drum and said adhered strip to a second position adjacent the tire-building drum; means for radially moving the transfer drum and said adhered strip into tangential rotational contact with said tire-building drum;

means for locking the transfer drum in a plurality of desired rotational positions, said locking means including a plurality of engageable elements located on the transfer drum and a cooperating element located on the axial movable means for engaging each of said engageable elements; and independent means for detecting the position of the means for axially moving the transfer drum; for detecting the rotational position of the transfer drum; and for detecting, respectively, whether the cutting means, the application means and the pressing means is in an operative or inoperative position.

2. Apparatus according to claim 1 wherein said transfer drum is radially moved by a pivotable arm attached to the transfer drum, the arm being pivotable about an axis parallel to the axis of the transfer drum.

3. Apparatus according to claim 2 wherein the pivotable arm is mounted on the means for axially moving the transfer drum.

4. Apparatus according to claim 1 wherein the application means includes an applicator means for guiding the strip to the transfer drum.

5. Apparatus according to claim 4 wherein the cutting means includes a cutting shoe, the strip being located between the pressing means and the cutting shoe; and means for cutting the strip.

6. Apparatus according to claim 5 wherein the cutting shoe includes a groove through which the cutting means contacts the strip.

7. Apparatus according to claim 4 including means for moving the applicator means, the pressing means and the cutting means alternately along mutually independent axes to and from the transfer drum.

8. Apparatus according to claim 4 wherein the applicator means includes a clip for securing the strip against the applicator.

9. Apparatus according to claim 4 wherein the applicator means includes pins for removably securing the strip to the apparatus.

10. Apparatus according to claim 4 wherein the cutting means is mounted on a movable carriage, the carriage being movable parallel to the axis of the transfer drum.

11. Apparatus according to claim 4 wherein the cutting means includes a toothed rotary disc, said disc being movable parallel to the axis of the transfer drum.

12. Apparatus according to claim 1, wherein the supply means includes a spool for the rubber strip, said strip being interleaved with a liner; and means for separating the strip from the liner.

13. Apparatus according to claim 1 comprising means for locking the transfer drum against axial movement in each of said first and second positions.

14. Apparatus according to claim 1 the means for detecting the position of the cutting means includes means for detecting operative positions of a cutting shoe and of a cutter.

15. Apparatus according to claim 14 wherein the position detecting means operates a control system, said control system comprising sequenced fluid operated jacks.

16. Apparatus according to claim 1 wherein the transfer drum radial movement is controlled by two fluid operated jacks; one of said jacks having a given stroke for radially moving the transfer drum to and from the first position; the other of said jacks having a stroke longer than the given stroke for radially moving the transfer drum into tangential rotational contact with the tire-building drum.

17. Apparatus according to claim 1 wherein the means for axially moving the transfer drum comprises a carriage-supporting the transfer drum and drive means connected to the carriage for moving the transfer drum parallel to the axis of the transfer drum.

* * * * *